UNITED STATES PATENT OFFICE 2,532,842

MEANS FOR CURING MEAT AND TO PROCESSES FOR PRODUCING THE CURING MEANS

Troy David Hill, Shreveport, La., assignor to The Figaro Company, Inc., Dallas, Tex., a corporation of Arizona No Drawing. Application July 29, 1949, Serial No. 107,646

6 Claims. (Cl. 99—159)

This invention relates to new and useful improvements in means for curing meat and to processes for producing the curing means.

The art of preserving meat by curing is old and simple if favorable temperatures are provided, but the quality of the meat produced by curing methods commonly used leaves a great deal to be desired. Meat cured by any process, without some form of injection, invariably results in areas becoming too salty. The brine injection process does not produce meat that is suitable for long keeping due to the fact that this process results in producing meats with a high moisture content which in turn promotes the growth of bacteria responsible for fermentation and the effect of such fermentative processes is to produce objectionable tastes that often resemble closely the results produced through putrefaction. Another objection to brine injection is that the excess moisture provides a more favorable media for mold growth which may result in the outer portions becoming unfit for human consumption.

Where meat is placed in cure without refrigeration, which is the case in the vast majority of the meat that is to be preserved for home consumption, an enormous loss is sustained due to the meat souring or becoming tainted near the bone joints before the curing agent has time to penetrate from the outer surface to these areas.

To fully appreciate the advantages of the curing process made possible by my invention it might be well to go into the mechanics of curing. The term "curing" as applied to meats results in rendering the bacteria responsible for putrefaction inactive as well as reducing the moisture content of the meat to a degree which no longer provides a media that is favorable to bacterial reproduction. This is accomplished by applying salt, either sodium chloride or sodium nitrate or a combination of the two. Just what happens is hypothetical to a degree, but it is my opinion that the osmotic pressure of the saline solution causes the liquid within the cellular structure of the meat to pass through the cell walls into the lymphatic tissue, thence this liquid makes its way to the surface via capillary attraction and evaporates. This same phenomena may apply to the method by which the bacteria that are present in the blood become inactive in the presence of a saline solution of sufficient concentration.

Accepting the foregoing as true makes the process of curing seem simple indeed. However, it does not prove as simple as it seems since there are numerous factors which have to be reckoned with before the process is completed. A glance at the results of surveys shows that up to 40% of all hams and shoulders placed "in cure" without refrigeration in certain sections of the United States are lost through bone souring or spoilage of one type or another.

One factor contributing to the complexity of the process of curing is the presence of bacteria, which are capable of bringing about putrefaction, in the blood of the animal. These are living organisms whose reproduction is kept in check by the antibodies that function as long as the animal is alive. The instant that life leaves the animal these antibodies cease to function and since the body temperature of the animal is favorable for bacterial reproduction, these bacteria begin to reproduce at once resulting in the number of bacteria multiplying and reaching astronomical figures in a relatively short time. The method commonly used to check this bacterial action is to reduce the temperature of the meat as quickly as possible to a point where the bacteria will not reproduce. This is possible if temperatures either natural or artificial are available. Unfortunately, such temperatures are not always available for a sufficient length of time to permit the salt to penetrate to the center of the cuts and the result is that souring sets in at these areas in the meantime.

The brine injection process when applied by either stitch pumping or by forcing the brine through the arteries will to a degree retard the action of bacteria but with accompanying disadvantages such as providing a media with sufficient moisture that fermentation may render the meat unpalatable, especially if the meat is to be stored for periods of time longer than sixty days at temperatures above 50 degrees Fahrenheit. Since many of the substances in the meat responsible for natural flavors are water soluble, the introduction of such liquid removes these substances and produces a piece of meat with a "flat" taste. Then too, the rate of mold growth is determined largely by the moisture content of the meat which explains why brine pumped meat molds so much faster than dry cured meat.

Providing bacterial action is retarded by low temperature for a sufficient period of time, meat may be cured by the application of the curing agent on the outer surface of the meat alone. It is generally conceded that a minimum time of two days per pound is necessary for this method of curing and by actual test the salt content of meat so cured runs from 8% upward depending upon the temperature at which the meat is kept while in cure. Actual tests have shown that hams cured by using the product of my invention will not have a salt content in excess of 6% and still will be sufficiently cured to keep under the most unfavorable temperatures.

Since bacterial action sets in immediately after the animal is slaughtered and moves rapidly, it has been found to be more effective if the curing compound is injected into the meat as early as possible after the animal is slaughtered, even while the body heat is still in the meat. In addition to stopping the action of bacteria, the curing agent will diffuse through the warm meat faster and bring about a quicker equalization of salt. It has long been proven that it is not good to inject brine into warm meat since souring results directly in a large percent of the cuts so injected.

I have developed a curing compound in the form of a somewhat rigid stick composed of various and usual meat curing ingredients which have been subjected to a novel process. As a result of the process, the curing stick is very hygroscopic so as to pick up moisture from the meat readily and rapidly, and at the same time is extremely porous or permeable so as to enhance the rapid curing action and to dissolve properly in the natural juices of the meat. The use of these curing sticks results in a more rapid and complete curing of meat, proper curing under adverse temperature conditions, and the production of cured meat having improved keeping qualities.

It is, therefore, one object of this invention to provide an improved meat curing compound in the form of a hygroscopic, porous body which may be inserted as a unit into the meat.

A further object of the invention is to provide a novel process for producing meat curing compounds.

Yet another object of the invention is to provide a novel meat curing process wherein meat is more completely cured, may be properly cured at elevated temperatures, and possesses better keeping qualities after being cured.

Other and additional objects will appear from a reading of the following description of the products and processes involved.

This application is a continuation-in-part of my copending application, Serial No. 758,723, filed July 2, 1947, now abandoned.

Since there are many curing mixtures presently in use, and since my invention is applicable to virtually all such mixtures which may be reduced to a solid, dry, or crystalline state, no attempt will be made to illustrate specific mixtures or compositions for curing purposes. Suffice it to say that most of the mixtures contain sodium chloride, sodium or potassium nitrate, and various spices and flavoring ingredients, all being combined in a mixture. The proportions of the various ingredients used vary widely, some of the ingredients may be omitted, and other replacement or additive ingredients may be used. I do not wish to be limited to any particular grouping or proportioning of curing substances since my invention and the use thereof are not dependent upon these factors.

In the preparation of my curing stick, a quantity of the curing mixture is thoroughly mixed in a dry state, or in a nearly dry state should some of the component materials be liquid in form. A limited quantity of water is then added and the mixing continued. Sufficient water should be used to cause the final mixture to have approximately the consistency of stiff bread dough. Additional portions of water or of the curing mixture may be added as the mixing is continued until this consistency is reached.

The dough-like mixture is now formed into an elongate strand or filament preferably from one-quarter to one-half inch in diameter, but which may be larger or smaller, and the strand is cut into lengths of several inches each. Obviously, this operation may be carried out by hand although it is preferable to employ suitable machinery for extruding the mixture and cutting it into lengths. Each length constitutes one of my curing sticks.

The sticks are then subjected to heat to drive off moisture and reduce the sticks to a hygroscopic state. At the same time, a degree of rigidity is imparted to the sticks which will permit their handling and insertion into a cut of meat.

A very important result of the process is the porosity of the dried sticks. While it would be possible to form sticks of a dry curing mixture by simple compression in much the same manner as medicinal pills are presently made, sticks so formed are compact rather than porous, and do not have the desirable characteristics of curing sticks formed by my process. As pointed out hereinbefore, the porous nature of my curing sticks causes them to act faster, to dissolve more readily within the meat, and to have a greater affinity for moisture so as to effect a more complete and rapid cure.

The temperature employed to dry the sticks is not particularly critical, nor is the type of heating chamber employed. Any type of oven or heating chamber, either of the batch or continuous output type may be used. As to the temperature used, it must only be high enough to dry the sticks with reasonable speed, such as in excess of 150° F., and yet not so high as to have a deleterious effect upon any of the stick ingredients. Thus, the temperature range might be stated as 150°–350° F., but it is to be noted that certain curing ingredients and mixtures might require lower or higher temperatures. It is necessary only to heat the sticks until they are dry and the salt ingredients have crystallized.

Following the heating step, the sticks are preferably allowed to cool to room temperature, and are then packaged in moisture proof containers. The latter step is important since the hygroscopic nature of the sticks must be preserved until the sticks are placed into use.

A porous or permeable, substantially rigid curing stick is thus provided, having considerable hygroscopicity or affinity for moisture. It has been found that my curing stick will absorb a greater amount of moisture than an equal quantity of the mixture ingredients in a dry, powdered form. Further, the stick will absorb more moisture than a pressure-molded stick of equal weight, and will absorb moisture at a much greater rate than either a loose powder or a compacted stick. Difficulty is encountered in obtaining the complete dissolving of a compacted curing stick in a cut of meat, whereas my curing stick dissolves with ease in a relatively short time. This means that the curing ingredients are diffused through the meat much sooner and that bacterial action is inhibited at a much earlier state.

In the use of my curing stick, any suitable means or type of instrument is employed for inserting one or more of the sticks into the meat. It is desirable to insert some of the sticks along the bones in the cut and into proximity with any bone joints which may be present. Of course, in larger cuts, sticks may also be inserted into the body of the meat. The number of sticks used will depend upon their size and the weight of the cut being cured. Also, it is usually preferable to employ a surface pack of curing compound upon the outside of the cut of meat in the ordinary manner.

By this method, a dry meat cure is obtained, and at the same time a rapid distribution of the curing material throughout the meat, is had.

It is to be noted that my curing stick is not only hygroscopic and porous, but that its porosity is maintained by its physical state. The substantially rigid or hardened condition of the stick prevents the packing together of the curing particles or crystals, the crumbling of the stick, or other physical changes which might reduce its porosity. The sticks may thus be packed, shipped, and handled without a loss of this valuable characteristic.

Simultaneously, the moisture proof packaging of the sticks preserves their ability to absorb large quantities of moisture.

It is further pointed out that the curing ingredients and the water may all be mixed at once, or the various ingredients and the water may be added and mixed together in any desired sequence. It is not essential that the ingredients be mixed first in a dry state and the water later added. The latter method has been found efficacious, however.

Further, it is not essential that the product be molded into the form of a cylindrical stick. The latter has been found to represent a highly convenient form for use and withstands well the necessary handling and shipping. So long, however, as the form of the product permits its insertion into the meat, any desired or suitable shape for the curing product bodies may be used. The sticks may be arcuate, polygonal or irregular in cross-section, balls or pellets of the curing product may be used, or the product might be in the form of disks or cubes which could be inserted into the meat. To cover the various permissible shapes of the bodies, the phrase "selected shape" has been used.

What I claim and desire to secure by Letters Patent is:

1. The method of making a meat curing product which includes, admixing curing ingredients and water to form a mass having the consistency of stiff dough, forming the mass into bodies of stick form, and then drying the bodies so as to substantially dehydrate and reduce said bodies to a hygroscopic porous solid form.

2. The method of making a meat curing product which includes, admixing curing ingredients, adding water to the mixture and mixing to form a mass having the consistency of stiff dough, forming the mass into bodies of stick form, and then heating the bodies so as to substantially dehydrate and reduce said bodies to a hygroscopic porous solid form.

3. The method of making a meat curing product which includes, admixing curing ingredients and water to form a mass having the consistency of stiff dough, forming the mass into sticks, and then drying the sticks so as to substantially dehydrate and reduce said sticks to a hygroscopic porous solid form.

4. A meat curing product for injection in meats including, a hygroscopic porous solid body of stick form composed of a mixture of meat curing ingredients.

5. A meat curing product for injection in meats including, a body of stick form and composed of a mixture of meat curing ingredients, said body being porous and substantially rigid and being hygroscopic in nature.

6. A meat curing product for injection in meats including, a hygroscopic porous stick composed of a mixture of meat curing ingredients.

TROY DAVID HILL.

REFERENCES CITED

The following references are of record in the file of this patent:

UNITED STATES PATENTS

| Number | Name | Date |
|---|---|---|
| 609,799 | Flinn | Aug. 30, 1898 |
| 2,054,624 | Griffith | Sept. 15, 1936 |
| 2,054,625 | Griffith | Sept. 15, 1936 |
| 2,442,663 | Rinehart | June 1, 1948 |

FOREIGN PATENTS

| Number | Country | Date |
|---|---|---|
| 79,212 | Germany | Jan. 16, 1895 |